(12) United States Patent
Abawi

(10) Patent No.: US 8,656,761 B2
(45) Date of Patent: Feb. 25, 2014

(54) SYSTEMS AND METHODS FOR USE IN PROVIDING A SENSOR SIGNAL INDEPENDENT OF GROUND

(75) Inventor: Daniel Zahi Abawi, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 111 days.

(21) Appl. No.: 13/117,639

(22) Filed: May 27, 2011

(65) Prior Publication Data

US 2012/0297864 A1    Nov. 29, 2012

(51) Int. Cl.
*G01M 15/00*    (2006.01)

(52) U.S. Cl.
USPC ..................................................... 73/112.01

(58) Field of Classification Search
USPC ..................................................... 73/112.01
See application file for complete search history.

(56) References Cited

U.S. PATENT DOCUMENTS

| | | | |
|---|---|---|---|
| 3,667,036 A * | 5/1972 | Seachman | 324/72 |
| 4,142,482 A * | 3/1979 | Asano et al. | 123/688 |
| 4,500,841 A | 2/1985 | Morey | |
| 5,477,142 A | 12/1995 | Good et al. | |
| 5,719,529 A * | 2/1998 | Kawahara et al. | 330/253 |
| 6,040,692 A | 3/2000 | Manlove et al. | |
| 6,133,728 A | 10/2000 | Manlove et al. | |
| 6,265,976 B1 | 7/2001 | Roesner | |
| 7,130,414 B2 * | 10/2006 | Enriquez et al. | 379/399.01 |
| 7,378,875 B2 * | 5/2008 | Lee et al. | 326/82 |
| 7,760,027 B2 * | 7/2010 | Murji et al. | 330/298 |
| 2004/0000841 A1 | 1/2004 | Phelps et al. | |
| 2011/0026739 A1 * | 2/2011 | Thomsen et al. | 381/120 |
| 2012/0068714 A1 * | 3/2012 | Wang et al. | 324/414 |
| 2012/0121106 A1 * | 5/2012 | Henriksen | 381/94.1 |
| 2012/0212277 A1 * | 8/2012 | Roylance et al. | 327/308 |

OTHER PUBLICATIONS

Zumbahlen, H Basic Linear Design, 2007, Chapter 2: Other Linear Circuits, p. 2.29, figure 2.26.
Danish Patent Search Report for Application No. 70258, Dec. 13, 2012.

* cited by examiner

*Primary Examiner* — Freddie Kirkland, III
(74) *Attorney, Agent, or Firm* — Fletcher Yoder, P.C.

(57) ABSTRACT

Isolation circuits, turbine data acquisition systems, and related methods are disclosed. One example isolation circuit includes a voltage divider circuit for coupling to an operational sensor, a clamping circuit connected to said voltage divider circuit and a gain circuit connected to said clamping circuit. The voltage divider circuit is configured to divide an amplitude of a signal received from the sensor. The clamping circuit is configured to limit voltage from said voltage divider circuit. The gain circuit includes an output. The isolation circuit provides a single-ended output signal to the output of the gain circuit as a function of the sensor signal and independent of ground.

18 Claims, 2 Drawing Sheets

SYSTEMS AND METHODS FOR USE IN PROVIDING A SENSOR SIGNAL INDEPENDENT OF GROUND

BACKGROUND OF THE INVENTION

The field of the invention relates generally to sensor isolation circuits and, more particularly, to systems and methods for use in providing a sensor signal independent of ground.

Gas turbine engine assemblies are often used as a power source within a variety of applications, such as power generation plants and aircraft. At least some known gas turbine engine systems include multiple sensors to monitor various conditions/operations of the gas turbine engine system. For example, gas turbine engine assemblies may include a speed sensor to provide a signal indicative of a rotational speed of a turbine shaft.

A sensor may be connected to multiple circuits within the gas turbine engine assembly for purposes of control, feedback, and/or monitoring, for example. When the sensor is coupled to more than one circuit, isolation is often required to avoid ground loops which may adversely affect the accuracy of the sensor and/or degrade the circuit performance. At least some known gas turbine engine assemblies employ independent power supplies for each circuit connected to a sensor. Alternatively, other known gas turbine engine assemblies use one or more transformers to electrically isolate the sensor from the circuits. However, transformers are generally bulky and may provide only a limited frequency response.

BRIEF DESCRIPTION OF THE INVENTION

In one aspect, an isolation circuit for use in providing a sensor signal independent of ground is provided. The isolation circuit includes a voltage divider circuit for coupling to an operational sensor, a clamping circuit connected to the voltage divider circuit and a gain circuit connected to the clamping circuit. The voltage divider circuit is configured to divide an amplitude of a signal received from the sensor. The clamping circuit is configured to limit voltage from the voltage divider circuit. The gain circuit includes an output. The isolation circuit provides a single-ended output signal to the output of the gain circuit as a function of the sensor signal and independent of ground.

In another aspect, a gas turbine engine assembly is provided. The gas turbine engine assembly includes a speed sensor for generating a differential signal indicative of an operating speed of a component and an isolation circuit for coupling to the speed sensor to receive the differential signal from the speed sensor. The isolation circuit is configured to generate a single-ended output signal as a function of the differential signal and independent of ground.

In yet another aspect, a method for use in providing a sensor signal independent of ground is provided. The method includes providing an isolation circuit to couple a sensor to a control system of a gas turbine engine assembly. The isolation circuit includes a voltage divider circuit, a clamping circuit connected to the voltage divider circuit, and a gain circuit connected to the clamping circuit. The method includes receiving a differential input signal from the sensor, dividing, at a resistor network of the voltage divider circuit, an amplitude of the differential sensor signal, and generating, at an operational amplifier of the gain circuit, a single-ended output signal as a function of the differential sensor signal and independent of ground.

DETAILED DESCRIPTION OF THE INVENTION

Figure 1:
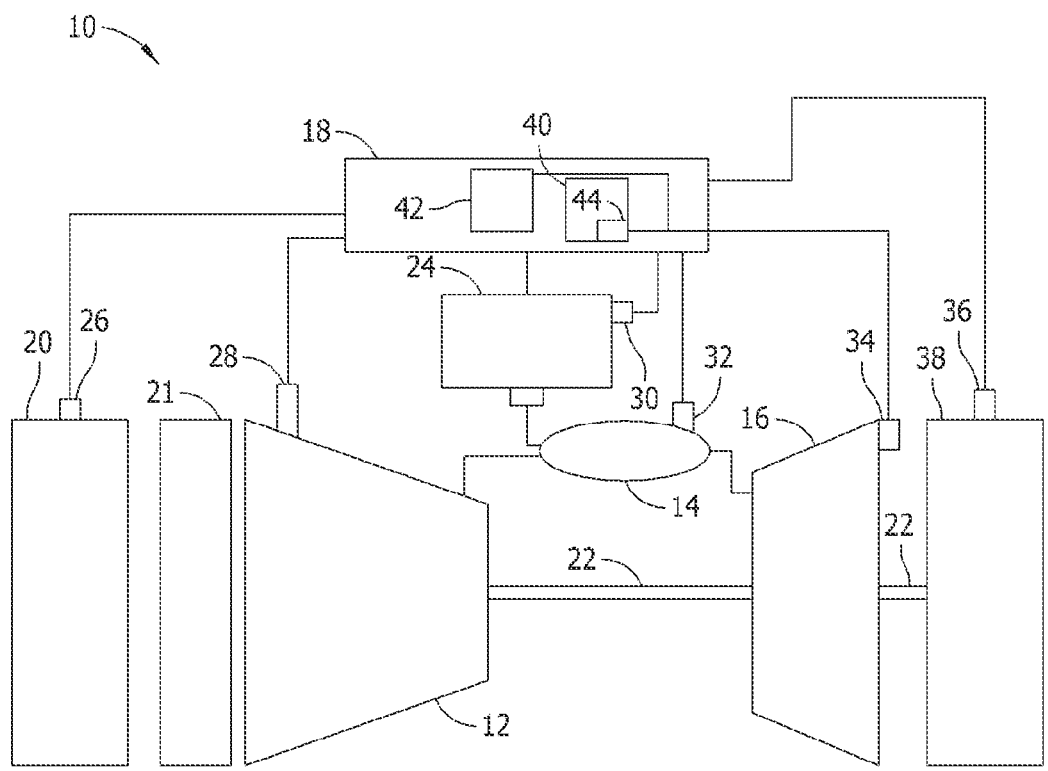
FIG. 1 is a block diagram of an exemplary gas turbine engine assembly.

FIG. 1 is a schematic diagram of an exemplary gas turbine engine assembly 10. In the exemplary embodiment, gas turbine engine assembly 10 includes a compressor 12, a combustor 14, a turbine 16 that is drivingly coupled to compressor 12 via a rotor shaft 22, a control system 18, and a fuel control assembly 24. Combustor 14 is coupled to compressor 12 such that combustor 14 is in flow communication with compressor 12. Fuel control assembly 24 is coupled to combustor 14 for channeling fuel into combustor 14. An inlet duct 20 channels ambient air to compressor 12. In one embodiment, injected water and/or other humidifying agents are also channeled to compressor 12 through inlet duct 20. Inlet duct 20 may include multiple ducts, filters, screens and/or sound-absorbing devices that contribute to pressure losses of ambient air flowing through inlet duct 20 into one or more inlet guide vanes 21 of compressor 12.

During operation, inlet duct 20 channels air towards compressor 12 that compresses the inlet air to higher pressures and temperatures. Compressor 12 discharges compressed air towards combustor 14 wherein it is mixed with fuel and ignited to generate combustion gases that flow to turbine 16, which drives compressor 12. Combustor 14 channels combustion gases to turbine 16 wherein gas stream thermal energy is converted to mechanical rotational energy.

In the exemplary embodiment, gas turbine engine assembly 10 may be used to drive a load 38, such as a generator (not shown) coupled to rotor shaft 22. In an alternative embodiment, load 38 may be coupled to a forward extension (not shown) of rotor shaft 22. In still other embodiments, gas turbine engine assembly 10 may be employed in a vehicle, such as an aircraft.

The operation of gas turbine engine assembly 10 may be monitored by several sensors 26-36 that detect various operating conditions of turbine 16, load 38, and/or ambient environment. For example, sensors 26-36 may also include flow sensors, speed sensors, flame detector sensors, valve position sensors, guide vane angle sensors, and/or other sensors that sense various parameters (e.g., temperatures, pressures, and gas flows at defined locations, etc.) relative to the operation of gas turbine engine assembly 10. In the exemplary embodiment, sensor 34 is a speed sensor for use in generating a differential speed signal indicative of rotational speed of the rotor shaft 22.

In the exemplary embodiment, control system 18 includes a monitoring module 40 and a control module 42. Speed sensor 34 is coupled to monitoring module 40 and to control module 42. Monitoring module 40, however, is coupled to speed sensor 34 via isolation circuit 44. In combination, speed sensor 34 and isolation circuit 44 form a turbine data acquisition system. It should be appreciated that any one or more of the sensors 26-36 illustrated in FIG. 1 may be coupled via an isolation circuit to control system 18, including one or more modules therein. Further, in other embodiments, an isolation circuit may be included in a control module, rather than being included in a monitoring module. And, in still other embodiments, a monitoring module and a control module may each include an isolation circuit.

Figure 2:
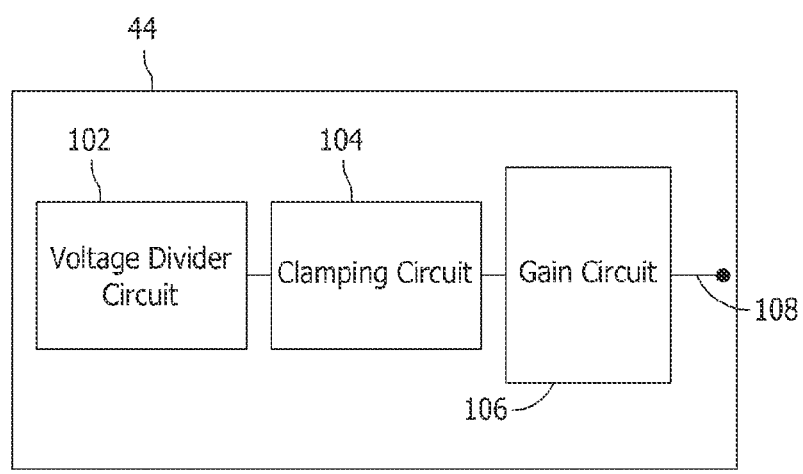
FIG. 2 is a block diagram of an exemplary isolation circuit used with the gas turbine engine assembly shown in FIG. 1.

FIG. 2 is a block diagram of isolation circuit 44. In the exemplary embodiment, isolation circuit 44 includes a voltage divider circuit 102 for use in coupling to sensor 34. Voltage divider circuit 102 divides an amplitude of a sensor signal from sensor 34. Isolation circuit 44 includes a clamping circuit 104 coupled to voltage divider circuit 102 and a gain circuit 106 coupled to clamping circuit 104. Clamping circuit 104 limits voltage from divider circuit 102, and gain circuit 106 includes an output 108. Isolation circuit 44 provides a single-ended output signal to output 108 of gain circuit 106 as a function of the differential sensor signal of speed sensor 34 and independent of ground.

In such an embodiment, isolation circuit 44 enables speed sensor 34 to be coupled to monitoring module 40 and to control module 42, without a duplicate ground connection. As such, multiple ground loops between sensor 34 and modules 40 and 42 are not created. Accordingly, isolation circuit 44 may also eliminate a need for a transformer(s) and/or a separate power source(s) for monitoring module 40 and for control module 42. Moreover, and as explained below, isolation circuit 44 may provide improved frequency response over known transformers. Further still, in some embodiments, isolation circuit 44 may be substantially only include off-the-shelf components, thus improving cost savings, and/or circuit board space savings, as compared to known transformers and/or using separate power sources.

Figure 3:
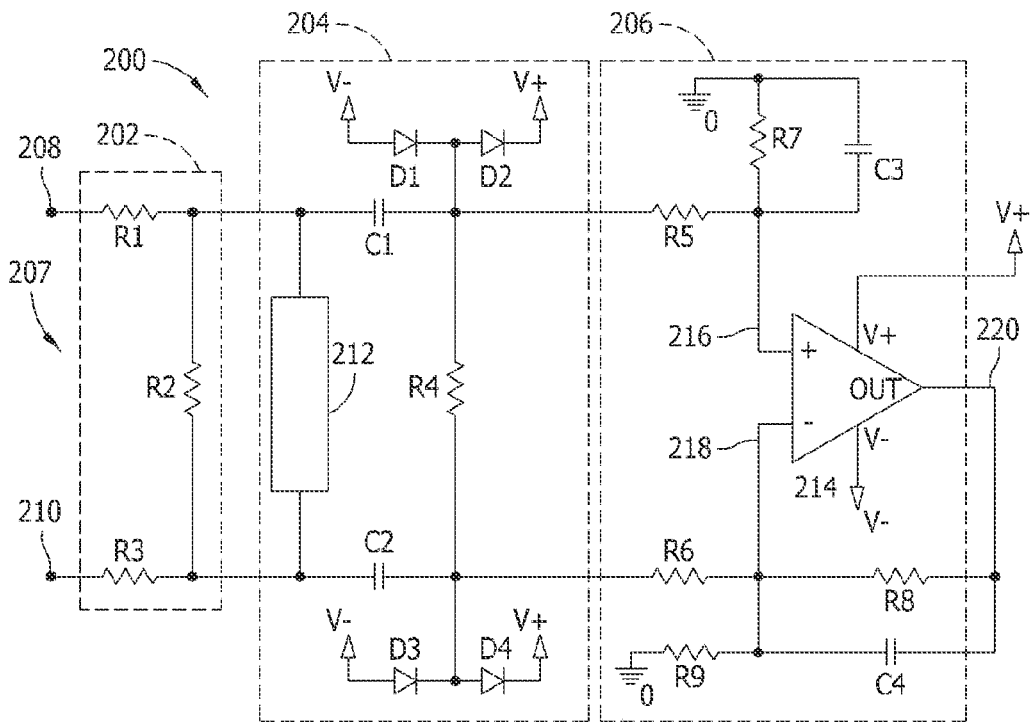
FIG. 3 is an exemplary schematic diagram of the isolation circuit shown in FIG. 2.

FIG. 3 is an exemplary schematic of an alternate isolation circuit 200 that may be used to provide a sensor signal independent of ground. In the exemplary embodiment, isolation circuit 200 includes a voltage divider circuit 202, a clamping circuit 204 connected to voltage divider circuit 202, and a gain circuit 206 connected to clamping circuit 204.

In the exemplary embodiment, voltage divider circuit 202 includes a resistor network 207. More specifically, resistor network 207 includes three resistors R1, R2, and R3. Resistors R1-R3 are coupled in series between input terminals 208 and 210. Resistors R1-R3 are coupled to divide an amplitude of an input signal to terminals 208 and 210 according to the proportional resistance of resistors R1-R3. Specifically, in the exemplary embodiment, clamping circuit 204 is connected in parallel with resistor R2. Accordingly, during operation, voltage divider circuit 202 provides a signal that is approximately equal to the input signal multiplied by the resistance of resistor R2 and divided by the total resistance of resistors R1-R3 (i.e., $V_{input} \times R2/(R1+R2+R3)$). It should be appreciated that various kinds of resistances and/or any number of resistors may be employed to provide a desired voltage to clamping circuit 204. In at least one embodiment, a voltage divider circuit may include any combination of resistors, capacitors and/or inductors that enables an amplitude of a sensor signal to be divided as described herein.

Clamping circuit 204 includes a transient voltage suppression (TVS) device 212. TVS device 212 is coupled in parallel with resistor R2 to clamp the voltage across resistor R2. TVS device 212 may be selected to clamp the voltage to desired voltage ranges. In this exemplary embodiment, TVS device 212 device is a bi-directional device that is structured to clamp voltages at 26VDC (e.g., component SMBJ26 commercially available from Vishay Semiconductors, Microsemi Corporation, etc.). Moreover, in this exemplary embodiment, TVS device 212 is structured to provide electromagnetic interference (EMI) protection and/or electrostatic discharge (ESD) protection to isolation circuit 200.

As shown, in the exemplary embodiment, clamping circuit 204 includes capacitor C1 coupled in series between TVS device 212 and node A and capacitor C2 coupled in series between TVS device 212 and node B. During operation, capacitors C1 and C2 block a DC voltage component of a differential sensor signal, if any, provided from a sensor through voltage divider circuit 202.

In addition to TVS device 212 and capacitors C1 and C2, clamping circuit 204 includes diodes D1-D4. More specifically, in the exemplary embodiment, diode D1 is connected between a negative voltage source V− and node A, and diode D2 is connected between a positive voltage source V+ and node A. Additionally, diode D3 is connected between negative voltage source V− and node B, and diode D4 is connected between positive voltage source V+ and node B. Resistor R4 is connected between node A and node B.

Each diode D1-D4 defines a bias voltage. Accordingly, during operation, diodes D1-D4 clamps voltage at respective nodes A and B to within its bias voltage of negative voltage source V− and/or positive voltage source V+. As such, diodes D1-D4 may be selected to clamp voltages at nodes A and B within a desired range. For example, if positive voltage source V+ is 5VDC and negative voltage sources V− is −24VDC, diodes D1-D4 may be selected to clamp voltage at nodes A and B to substantially between −24VDC and 5VDC (±bias voltage of diodes D1-D4). Other voltages and different configurations of diodes (e.g., number, types, position, etc.) may be used in other embodiments to clamp voltages above/below one or more desired values. In some example embodiments, diodes may be tied to readily accessible voltage, such as voltage sources of monitoring module 40 and/or control module 42. In still other embodiments, one or more diodes connected to a voltage source may be omitted.

It should be appreciated that clamping circuit 204 may be constructed from one or more different types of devices to clamp voltages to desired levels and/or to provide electromagnetic interference (EMI) and/or electro-static discharge (ESD) protection. For example, in an alternative embodiment, clamping circuit 204 may include two Zener diodes, one rated for 5VDC and the other rated for 15VDC. The anode of the 5VDC Zener diode may be connected to the cathode of the 15VDC Zener diode, and the cathode of the 5VDC Zener diode may be connected to the anode of the 15VDC Zener diode. In such an embodiment, clamping circuit 204 may be connected to clamp a voltage within the unbalanced range of between about +5V to about −15V. As should be apparent, various combinations and/or ratings of Zener diodes or other diodes may be used to clamp a divided sensor signal to various balanced or unbalanced voltage ranges.

Referring again to FIG. 3, gain circuit 206 includes an operational amplifier 214. In the exemplary embodiment, operational amplifier 214 is part #LT1355 (commercially available from Linear Technology). Alternatively, it should be appreciated, however, that in other embodiments, a gain circuit may be constructed from a different operational amplifier, multiple discrete transistors, and/or other suitable device. Operational amplifier 214 includes a positive input 216, a negative input 218, and an output 220. During operation, operational amplifier 214 provides a gain to the voltage received from clamping circuit 204 that is sufficient to adjust a single-ended output signal to a desired level. For example, in one example embodiment, the gain from operation amplifier 214 is about 1.5 V/V. As should be apparent, operational amplifiers may be connected and/or selected to provide different gains in other embodiments. In at least one embodiment, gain circuit 206 may provide a substantially nominal gain.

In the exemplary embodiment, operational amplifier 214 is connected to power sources, to ground, and to clamping circuit 204 via multiple discrete components. Specifically, resistor R5 is connected between node A and positive input 216, and resistor R6 is connected in series between node A and negative input 218. Positive input 216 is connected to ground GND through a parallel combination of resistor R7 and capacitor C3. Negative input 218 is connected to output 220 through a parallel combination of resistor R8 and capacitor C4. Negative input 218 is also coupled to ground GND through resistor R9.

One or more of resistors R1-R8 and/or of capacitors C1-C4 of isolation circuit 200 may be selected to provide a desired performance, such as output voltage, operating bandwidth, DC error, etc. In this particular example, the output voltage is represented as:

$$V_{Out} = -R/R \times V_{IN-NEG} + 5 \times -R/R + (R/(r+R)) \times ((R/(RR)) + 1) \times V_{IN-POS}$$

In the exemplary embodiment, isolation circuit 200 may provide flexible frequency response. Specifically, any of resistors R1-R8 and/or capacitors C1-C4 may be selectively adjusted to alter the frequency response of isolation circuit 200. In one exemplary example, isolation circuit 200 may define a pass-band (about –3.0 dB) of between about 1.3 Hz to about 982 kHz on the positive input of operational amplifier 214, and a pass-band (about –3.0 dB) of between about 1.5 Hz to about 220 kHz on the positive input of operational amplifier 214. Accordingly, in this particular example, the overall operating bandwidth (about –3.0 dB) of isolation circuit 200 is between about 1.59 Hz to about 220 kHz. As should be apparent, the operating bandwidth includes several ranges, such as a range of between about 7.0 Hz to about 150 kHz, a range of between about 10 Hz to about 150 kHz, a range of between about 25 Hz to about 100 kHz, a range of between about 35 Hz to about 100 kHz and/or any other discrete values bounding a range within the operating bandwidth, etc.

Further, as shown in FIG. 3, node C is connected to ground through resistor R9. In various embodiments, the single-ended output signal of isolation circuit 200 may be level shifted, by connecting node C to a power source through resistor R9. Specifically, when node C is coupled to a 5VDC power source, for example, isolation circuit 200 includes a nominal DC bias of about –9.08VDC and a DC error of about ±24 mV at 25±2° C. (and/or ±66 mV under/over temperature (–40 to 85° C.)). It should be appreciated that isolation circuit 200 is not limited to the particular output characteristics disclosed herein. One or more of the power sources, resistors, capacitors, diodes, and operational amplifiers may be altered to provide desired output characteristics, possibly depending on requirements of a gas turbine engine assembly or other application of isolation circuits disclosed herein.

During fabrication, isolation circuit 200 may be fabricated with common, off-the-shelf components, such as resistors, capacitors, diodes, and operational amplifiers, etc. In some embodiments, use of common, off-the-shelf components may facilitate cost reduction and/or convenient second sourcing of required components. Further, in one embodiment, isolation circuit 200 may be constructed on less than about 1.0 square inch of a printed circuit board (not shown).

Figure 4:
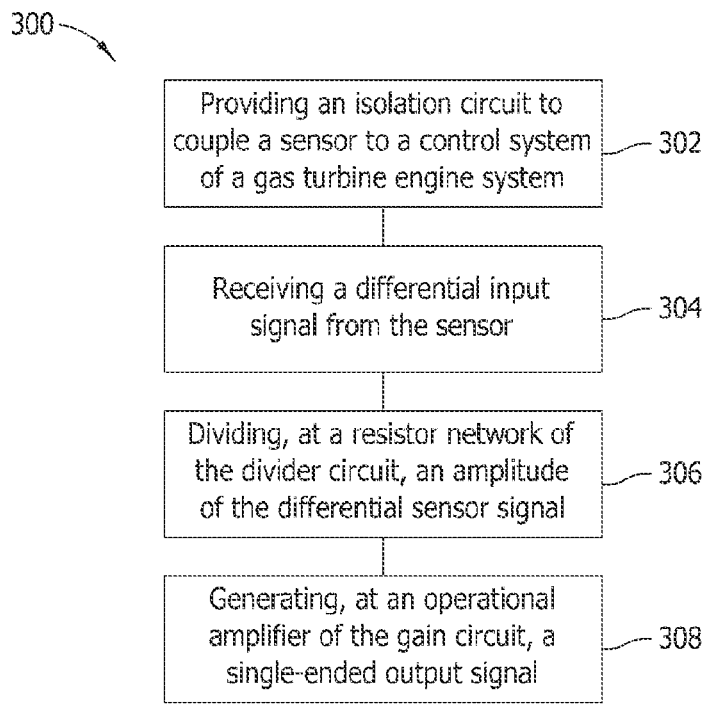
FIG. 4 is a flowchart of an exemplary method for use in providing a sensor signal independent of ground.

FIG. 4 illustrates an exemplary method 300 for use in providing a sensor signal independent of ground in accordance with another example embodiment of the present disclosure. While exemplary method 300 may be used with gas turbine engine assembly 10 (as shown in FIG. 1), it should be appreciated that methods described herein are not limited to the exemplary gas turbine engine assemblies and isolation circuits described herein. Likewise, isolation circuits and/or gas turbine engine assemblies contemplated by the present disclosure should not be understood to be limited to the exemplary methods described herein.

Method 300 includes providing 302 an isolation circuit, such as isolation circuit 200 shown in FIG. 3, to couple a sensor to a control system of a gas turbine engine assembly. The isolation circuit includes a voltage divider circuit, a clamping circuit coupled to the voltage divider circuit, and a gain circuit coupled to the clamping circuit. Method 300 also includes receiving 304 a differential input signal from the sensor, dividing 306, at a resistor network of the voltage divider circuit, an amplitude of the differential sensor signal, and generating 308, at an operational amplifier of the gain circuit, a single-ended output signal as a function of the differential sensor signal and independent of ground.

In some embodiments, method 300 may include clamping, at the clamping circuit, the divided differential sensor signal to a desired voltage range. Additionally, or alternatively, method 300 may include blocking, at the clamping circuit, a DC component of the differential sensor signal.

One or more of the above-described embodiments may eliminate one or more ground loops when a sensor is coupled to more than one module. Accordingly, an isolation circuit as described herein may eliminate the need for a transformer(s) and/or a separate power source(s) for a monitoring module and/or for a control module. Moreover, an isolation circuit as described herein may provide improved frequency response over known transformers. Further still, in some embodiments, an isolation circuit as described herein may permit use of off-the-shelf components, thus improving cost savings, and/or circuit board space savings, as compared to known transformers and/or using separate power sources.

Although specific features of various embodiments may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An isolation circuit for use in providing a sensor signal independent of ground, said isolation circuit comprising:
   a voltage divider circuit for coupling to an operational sensor, said voltage divider circuit configured to divide an amplitude of a signal received from the operational sensor;
   a clamping circuit, comprising at least one transient voltage suppression (TVS) device, connected to said voltage divider circuit, said clamping circuit configured to limit voltage from said voltage divider circuit; and
   a gain circuit connected to said clamping circuit, said gain circuit comprising an output, wherein said isolation circuit provides a single-ended output signal to the output of the gain circuit as a function of the sensor signal and independent of ground.

2. The isolation circuit of claim 1, wherein said voltage divider circuit comprises a resistor network.

3. The isolation circuit of claim 2, wherein said resistor network comprises at least two resistors, and wherein said clamping circuit is coupled in parallel with at least one of said at least two resistors in said resistor network.

4. The isolation circuit of claim 1, wherein said gain circuit comprises an operational amplifier comprising a positive input and a negative input, and wherein the TVS device is coupled across said positive and negative inputs of said operational amplifier.

5. The isolation circuit of claim 4, wherein said clamping circuit includes a first diode coupled between one of said amplifier positive and negative inputs and a positive voltage source, and a second diode coupled between one of said amplifier positive and negative inputs and a negative voltage source.

6. The isolation circuit of claim 4, further comprising a first resistor connected in-line between said positive input and said TVS device and a second resistor connected in-line between said negative input and said TVS device.

7. The isolation circuit of claim 4, wherein said TVS device facilities protecting said isolation circuit from electromagnetic discharge.

8. An isolation circuit for use in providing a sensor signal independent of ground, said isolation circuit comprising:
a voltage divider circuit for coupling to an operational sensor, said voltage divider circuit configured to divide an amplitude of a signal received from the operational sensor;
a clamping circuit connected to said voltage divider circuit, said clamping circuit configured to limit voltage from said voltage divider circuit; and
a gain circuit connected to said clamping circuit, said gain circuit comprising an output, wherein said isolation circuit provides a single-ended output signal to the output of the gain circuit as a function of the sensor signal and independent of ground, wherein said clamping circuit comprises at least one capacitor connected in-line between said divider circuit and said gain circuit to block DC voltage between said voltage divider circuit and said gain circuit.

9. An isolation circuit for use in providing a sensor signal independent of ground, said isolation circuit comprising:
a voltage divider circuit for coupling to an operational sensor, said voltage divider circuit configured to divide an amplitude of a signal received from the operational sensor;
a clamping circuit connected to said voltage divider circuit, said clamping circuit configured to limit voltage from said voltage divider circuit; and
a gain circuit connected to said clamping circuit, said gain circuit comprising an output, wherein said isolation circuit provides a single-ended output signal to the output of the gain circuit as a function of the sensor signal and independent of ground, wherein said isolation circuit is configured to provide an operating bandwidth at a range of between about 25 Hz to about 100 kHz.

10. A speed sensor assembly comprising:
a speed sensor for generating a differential signal indicative of an operating speed of a component; and
an isolation circuit for coupling to said speed sensor to receive the differential signal from said speed sensor, said isolation circuit configured to generate a single-ended output signal as a function of the differential signal and independent of ground.

11. The speed sensor assembly of claim 10, wherein said isolation circuit is configured to provide an operating bandwidth at a range of between about 35 Hz to about 100 kHz.

12. The speed sensor assembly of claim 11, wherein said isolation circuit is configured to provide an operating bandwidth at a range of between about 10 Hz to about 150 kHz.

13. The speed sensor assembly of claim 11, wherein said speed sensor comprises a magnetic speed sensor.

14. The speed sensor assembly of claim 11, further comprising a turbine, and wherein the speed sensor is positioned adjacent to said turbine.

15. The speed sensor assembly of claim 14, wherein the gas turbine engine system includes a monitoring module coupled to the speed sensor and a control module coupled to the speed sensor, the monitoring module connected to the speed sensor via said isolation circuit.

16. A method for use in providing a sensor signal independent of ground, said method comprising:
providing an isolation circuit to couple a sensor to a control system of a gas turbine engine assembly, said isolation circuit includes voltage divider circuit, a clamping circuit connected to the voltage divider circuit, and a gain circuit connected to the clamping circuit;
receiving a differential input signal from the sensor;
dividing, at a resistor network of the voltage divider circuit, an amplitude of the differential sensor signal; and
generating, at an operational amplifier of the gain circuit, a single-ended output signal as a function of the differential sensor signal and independent of ground.

17. The method of claim 16, further comprising clamping, at the clamping circuit, the divided differential sensor signal to a desired voltage range.

18. The method of claim 16, further comprising blocking, at the clamping circuit, a DC component of the differential sensor signal.

* * * * *